(12) United States Patent
Tripathi et al.

(10) Patent No.: US 8,539,089 B2
(45) Date of Patent: Sep. 17, 2013

(54) SYSTEM AND METHOD FOR VERTICAL PERIMETER PROTECTION

(75) Inventors: Sunay Tripathi, San Jose, CA (US); Bruce Curtis, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 3771 days.

(21) Appl. No.: 10/683,933

(22) Filed: Oct. 10, 2003

(65) Prior Publication Data
US 2005/0169309 A1 Aug. 4, 2005

Related U.S. Application Data

(60) Provisional application No. 60/465,147, filed on Apr. 23, 2003.

(51) Int. Cl.
*G06F 15/16* (2006.01)
(52) U.S. Cl.
USPC ............................................. 709/230
(58) Field of Classification Search
USPC .................. 709/203, 230; 718/105
See application file for complete search history.

(56) References Cited

U.S. PATENT DOCUMENTS

| | | | |
|---|---|---|---|
| 5,617,537 A * | 4/1997 | Yamada et al. | 709/214 |
| 5,826,081 A * | 10/1998 | Zolnowsky | 718/103 |
| 5,835,763 A * | 11/1998 | Klein | 718/101 |
| 6,338,078 B1 * | 1/2002 | Chang et al. | 718/102 |
| 6,418,458 B1 * | 7/2002 | Maresco | 718/103 |
| 6,490,632 B1 * | 12/2002 | Vepa et al. | 709/250 |
| 6,560,630 B1 * | 5/2003 | Vepa et al. | 718/105 |
| 6,631,422 B1 * | 10/2003 | Althaus et al. | 709/250 |
| 6,687,729 B1 * | 2/2004 | Sievert et al. | 718/102 |
| 6,898,617 B2 * | 5/2005 | Doolittle et al. | 709/201 |
| 7,058,057 B2 * | 6/2006 | Dooley et al. | 370/394 |
| 7,076,545 B2 * | 7/2006 | DiMambro | 709/223 |
| 7,114,011 B2 * | 9/2006 | Buch et al. | 709/250 |
| 7,143,410 B1 * | 11/2006 | Coffman et al. | 718/100 |
| 7,145,914 B2 * | 12/2006 | Olarig et al. | 370/413 |
| 7,177,943 B1 * | 2/2007 | Temoshenko et al. | 709/237 |
| 7,290,055 B2 * | 10/2007 | Tripathi | 709/229 |
| 7,296,093 B1 * | 11/2007 | Olarig et al. | 709/250 |
| 7,363,383 B2 * | 4/2008 | Tripathi et al. | 709/230 |
| 2002/0107903 A1 * | 8/2002 | Richter et al. | 709/201 |
| 2002/0107962 A1 * | 8/2002 | Richter et al. | 709/225 |
| 2002/0107971 A1 * | 8/2002 | Bailey et al. | 709/231 |
| 2002/0112087 A1 * | 8/2002 | Berg | 709/313 |
| 2002/0112188 A1 * | 8/2002 | Syvanne | 713/201 |
| 2003/0126297 A1 * | 7/2003 | Olarig et al. | 709/250 |
| 2003/0236837 A1 * | 12/2003 | Johnson et al. | 709/205 |
| 2003/0236919 A1 * | 12/2003 | Johnson et al. | 709/251 |
| 2004/0024873 A1 * | 2/2004 | DiMambro | 709/225 |
| 2004/0083347 A1 * | 4/2004 | Parson | 711/165 |
| 2004/0177165 A1 * | 9/2004 | Masputra et al. | 709/250 |
| 2005/0021874 A1 * | 1/2005 | Georgiou et al. | 709/250 |
| 2005/0122993 A1 * | 6/2005 | Tripathi et al. | 370/469 |
| 2005/0125539 A1 * | 6/2005 | Tripathi | 709/227 |

(Continued)

*Primary Examiner* — Jerry Dennison
(74) *Attorney, Agent, or Firm* — Marsh Fischmann & Breyfogle, LLP; Kent A. Lembke

(57) ABSTRACT

Embodiments of the present invention include a method for processing packets through a plurality of protocol layers comprising accessing a packet associated with a connection and processing the packet through the plurality of protocol layers using a single thread wherein connection state information used by the plurality of protocol layers is preserved by mutual exclusion of other threads processing packets for the connection through the plurality of protocol layers.

35 Claims, 7 Drawing Sheets

(56) References Cited

U.S. PATENT DOCUMENTS

| | | | |
|---|---|---|---|
| 2005/0138189 A1* | 6/2005 | Tripathi et al. | 709/230 |
| 2005/0169309 A1* | 8/2005 | Tripathi et al. | 370/469 |
| 2005/0188070 A1* | 8/2005 | Tripathi et al. | 709/223 |
| 2005/0286524 A1* | 12/2005 | Bennett | 370/389 |
| 2006/0047856 A1* | 3/2006 | Tripathi | 709/250 |
| 2007/0061437 A1* | 3/2007 | Berg | 709/223 |
| 2007/0061470 A1* | 3/2007 | Berg | 709/227 |
| 2007/0067046 A1* | 3/2007 | Berg | 700/1 |
| 2007/0086337 A1* | 4/2007 | Li et al. | 370/229 |
| 2007/0086360 A1* | 4/2007 | Berg | 370/254 |
| 2007/0121516 A1* | 5/2007 | Hannel et al. | 370/241 |
| 2007/0136489 A1* | 6/2007 | Temoshenko et al. | 709/237 |
| 2007/0217453 A1* | 9/2007 | Rhoades et al. | 370/503 |
| 2007/0233810 A1* | 10/2007 | Brownell et al. | 709/218 |
| 2007/0233825 A1* | 10/2007 | Brownell et al. | 709/220 |
| 2008/0013549 A1* | 1/2008 | Okagawa et al. | 370/397 |

* cited by examiner

SYSTEM AND METHOD FOR VERTICAL PERIMETER PROTECTION

CROSS REFERENCE TO RELATED APPLICATIONS

This application claims priority to the U.S. Provisional Patent Application No. 60/465,147 entitled "Vertical Perimeter Protection Mechanism" by Sunay Tripathi, filed Apr. 23, 2003 and is also incorporated herein by reference.

U.S. patent application Ser. No. 10/683,720 entitled "Multi-Threaded Accept Mechanism In A Vertical Perimeter Communication Environment" by Sunay Tripathi, filed Oct. 10, 2003 is incorporated herein by reference.

U.S. patent application Ser. No. 10/683,897 entitled "A Method And System For Processing Communications Packets According To Event Lists" by Sunay Tripathi and E. Nordmark, filed Oct. 10, 2003 is incorporated herein by reference.

U.S. patent application Ser. No. 10/683,959 entitled "Running A Communication Protocol State Machine Through A Packet Classifier" by Sunay Tripathi and Bruce Curtis, filed Oct. 10, 2003 is incorporated herein by reference.

U.S. patent application Ser. No. 10/683,934 entitled "A Method For Batch Processing Received Message Packets" by Sunay Tripathi and S. Kamatala, filed Oct. 10, 2003 is incorporated herein by reference.

U.S. patent application Ser. No. 10/683,762 entitled "A Method and System For Transmitting Packet Chains" by Sunay Tripathi, Bruce Curtis and C. Masputra, filed Oct. 10, 2003 is incorporated herein by reference.

BACKGROUND

Computer systems typically utilize a layered approach for implementing functionalities relating to communications frameworks where a protocol layer is a program module for processing different portions of data traveling from a network to the application or when the application decides to send data out to remote peer over the network. The layered approach requires examination of data by each protocol layer to determine if any work needs to be performed by that layer before sending the data to the next protocol layer.

Conventional perimeters provide per module, per protocol stack layer, or horizontal perimeters. This leads to the same packets being processed on more than one CPU in a multi-CPU environment. Processing the same packets on more than one CPU through the software layers leads to excessive context switching, increased latencies, and poor CPU data locality (e.g., cache locality). Under heavy load, the problem is compounded by the various locations a packet can get queued and by the various threads that finally process the packet. As a result, packets for the same connection go through various protocol layers where they have to contend for access to their state structures at each layer.

SUMMARY

Accordingly, what is needed is a protection mechanism such that once a packet for a particular connection is processed, it goes through all the protocol layers while providing mutual exclusion for its state structure at each protocol layer. Furthermore, what is needed is a system and method for processing a packet without the problems associated with conventional multi-processor and multi-threaded environments. Embodiments of the present invention provide vertical perimeter framework wherein a communication packet of a given connection is processed from beginning to end by a single processor without contending for additional locks and getting queued at each protocol layer. The vertical perimeter framework of the present invention comprises an exemplary kernel data structure, e.g., the 'squeue' (serialization queue type), and a worker thread controlled by the 'squeue' and both are bound to a single processor. This single processor processes all packets of the connection through the protocol layers, e.g., IP, TCP, and socket layers without interruption.

In accordance with embodiments of the present invention, a connection instance is assigned to a single vertical perimeter represented by an 'squeue' and its corresponding packets are only processed within the assigned vertical perimeter. An 'squeue' is processed by a single thread at a time and all data structures used to process a given connection from within the perimeter can be accessed without additional locking or mutual exclusion, thus improving both processor, e.g., CPU, performance and thread context data locality. Access of the connection meta data, the packet meta data, and the packet payload data is localized, thus reducing retrieval time for such data (e.g., in a localized cache specific to the CPU processing the packet). Once a packet is picked up for processing, for example, the thread enters the 'squeue' to process a packet, no additional locks are required and packet is processed through all protocol layers without additional queuing.

In a multi processor server system in accordance with embodiments of the invention, each 'squeue' is assigned to a different processor. Packet traversal through the protocol layers, e.g., NIC, IP, TCP, and socket, is generally not interrupted except to queue another task onto the 'squeue'. 'Squeue' connections are assigned to a particular 'squeue' at the connection setup time, for example, during a three-way handshake, and all packets for that connection are processed on the assigned 'squeue' only. Any queuing required for inbound or outbound packets is only at the time of entering the 'squeue'.

Embodiments of the present invention include a method for connecting a server system to a client comprising the steps of receiving a TCP connection request from a client at a socket on a server and starting a session. The method further includes classifying the packet to identify the connection structure (called 'conn') for incoming packets and further identifying the assigned 'squeue' from the 'conn'. Additionally, the method includes assigning the connection to a single processor of a multiprocessor server wherein the designated processor services all packets associated with the TCP connection through the required protocol layers until the session is terminated. The assignment takes into account the necessity to fan-out out new connections across all possible 'squeues' (or a subset of possible 'squeues') so that multiple CPUs can process the network traffic (a condition for high bandwidth NICs supporting 10 Gbps bandwidth or more).

Embodiments of the present invention also include a method for processing a packet on a server comprising the steps of receiving a packet associated with a TCP connection and assigning the packet to a single processor. The method further includes interrupting the single processor and if the processor is busy, queuing the packet in a 'squeue' specific to the processor. And if the processor is not busy, processing the packet on the single processor through the protocol layers. In this embodiment, packet traversal through the layers is generally not interrupted.

Embodiments of the present invention further include a connection structure for classifying a TCP connection and assigning packets associated with the TCP connection to one of a plurality of processors. If a packet of a non-established connection is received, then a 'conn' structure is automatically created and assigned to an 'squeue' associated with a single processor. If a packet is received for the particular 'conn', then that packet is assigned to the designated processor, (e.g., via the 'squeue' for the processor) to be processed on.

These and other objects and advantages of the present invention will no doubt become obvious to those of ordinary skill in the art after having read the following detailed description of embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention as set forth in the claims.

DESCRIPTION

Figure 1:
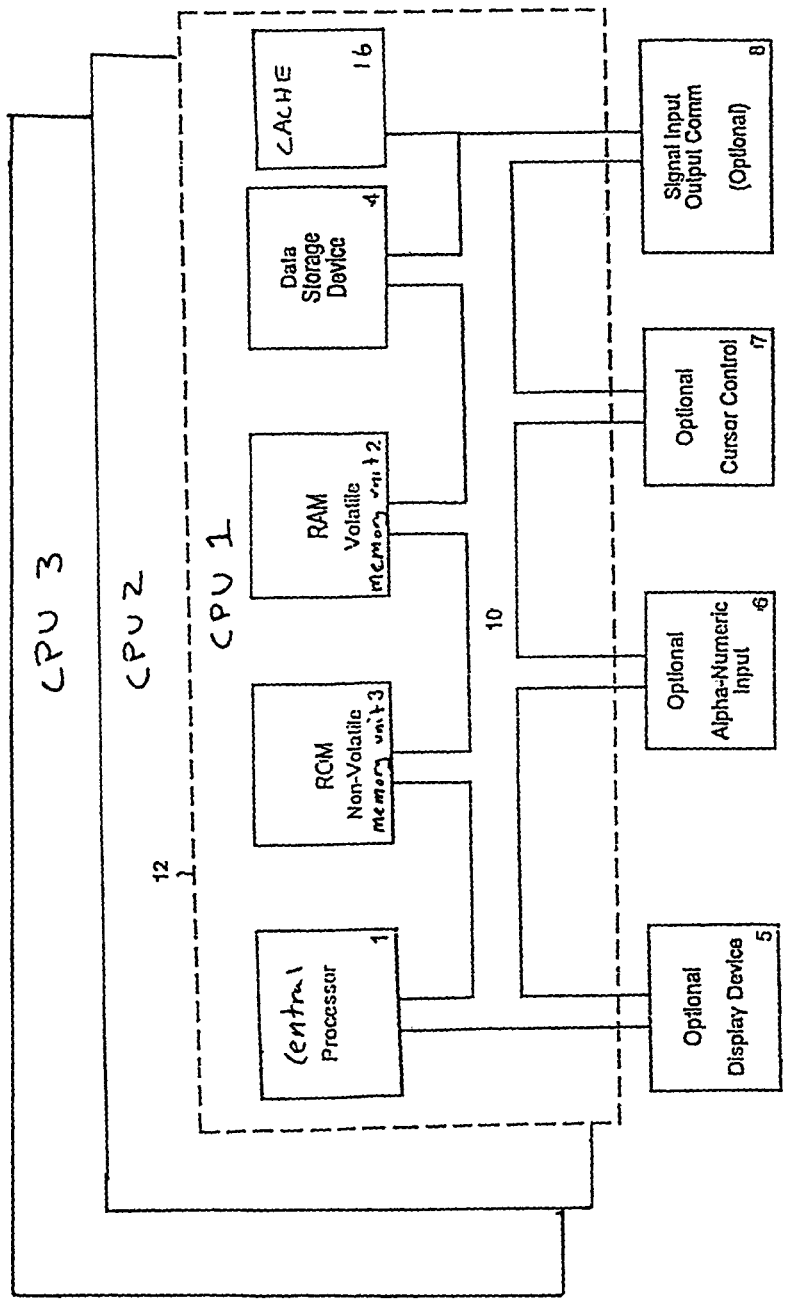
FIG. 1 is a logical block diagram of an exemplary embedded computer or server system in accordance with an embodiment of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "creating," "connecting," "transferring," "sending," "updating," "entering", "computing" or the like, refer to the action and processes (e.g., process 600 and 700) of a computer or computerized server system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, a block diagram of exemplary computer system 12 is shown. It is appreciated that computer system 12 of FIG. 1 described herein illustrates an exemplary configuration of an operational platform upon which embodiments of the present invention can be implemented. Nevertheless, other computer systems with differing configurations can also be used in place of computer system 12 within the scope of the present invention. For example, computer system 12 could be a server system, a personal computer, an embedded computer system or a system in which one or more of the components of the computer system is located remotely and accessed via a network.

Computer system 12 may include multiple processors and includes an address/data bus 10 for communicating information, a central processor 1 coupled with bus 10 for processing information and instructions, a cache 16 coupled to bus 10 for temporarily storing data, a volatile memory unit 2 (e.g., random access memory, static RAM, dynamic RAM, etc.) coupled with bus 10 for storing information and instructions for central processor 1 and a non-volatile memory unit 3 (e.g., read only memory, programmable ROM, flash memory, EPROM, EEPROM, etc.) coupled with bus 10 for storing static information and instructions for processor 1. Computer system 12 may also contain an optional display device 5 coupled to bus 10 for displaying information to the computer user. Moreover, computer system 12 also includes a data storage device 4 (e.g., disk drive) for storing information and instructions.

Also included in computer system 12 of FIG. 1 is an optional alphanumeric input device 6. Device 6 can communicate information and command selections to central processor 1. Computer system 12 also includes an optional cursor control or directing device 7 coupled to bus 10 for communicating user input information and command selections to central processor 1. Computer system 12 also includes signal communication interface 8, which is also coupled to bus 10, and can be a serial port. It is noted that the components associated with system 12 described above may be resident to and associated with one physical computing device. However, one or more of the components associated with system 12 may be physically distributed to other locations and be communicatively coupled together (e.g., via a network).

A System and Method for Vertical Perimeter Protection

A TCP connection provides for full duplex data transfer. That is, application-level data can be transferred in both directions between two hosts. For example, if there is a TCP connection between process A on one host and process B on another host, then application-level data can flow from A to B at the same time as application-level data flows from B to A. A TCP connection is also point-to-point, e.g., between a single sender and a single receiver. As a result, multicasting (the transfer of data from one sender to many receivers in a single send operation) is not generally performed with TCP.

When a process running in one host needs to initiate a connection with another process in another host, a TCP connection is required. The host that is initiating the connection is called the "client," while the other host is called the "server." These connotations will be used herein. The client application process first informs the client TCP layer that it needs to establish a connection to a process in the server.

Generally, the TCP layer in the client then proceeds to establish a TCP connection with the TCP layer in the server. The client first sends a special TCP segment, the server responds with a second special TCP segment, and the client responds again with a third special segment. The first two segments contain no "payload," e.g., no application-layer data. The third of these segments may carry a payload. Because three segments are sent between the two hosts, this connection establishment procedure is often referred to as a three-way handshake.

Figure 2:
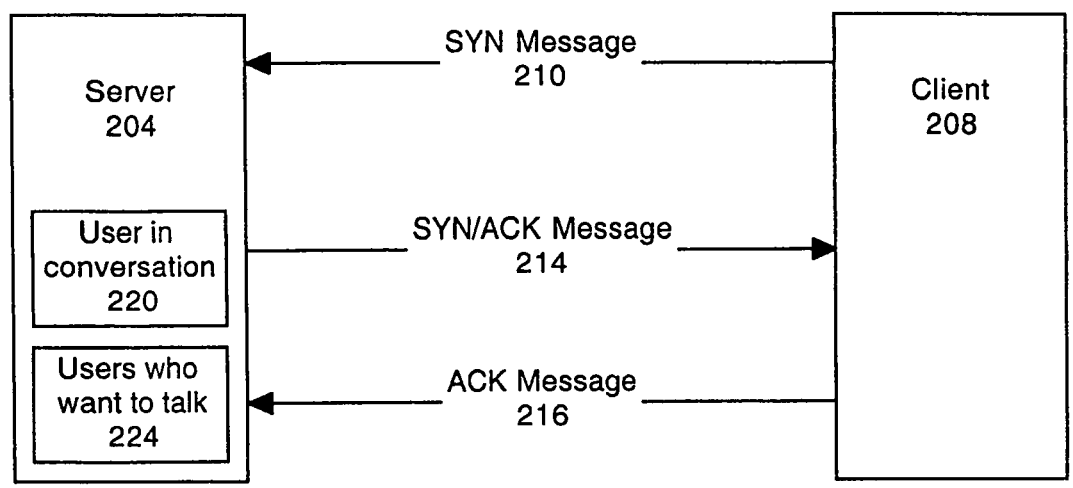
FIG. 2 is a block diagram of an exemplary server-client system wherein a three-way handshake is used to create a communication connection in accordance with an embodiment of the present invention.

FIG. 2 is a data flow diagram of an exemplary server-client system 200 wherein a three-way handshake is executed to make a TCP connection between the server 204 and the client 208. The three-way handshake is initiated from the client 208 with a "SYN" (SYNC) message 210 from one unique address to the TCP/IP server 204. The SYN message notifies the server 204 that the client 208 needs to communicate. The client 208 first sends the server 204 its address and the server 204 logs the address in the table 224 of users that need to talk (this is part one of the three-way handshake). Then the server 204 sends a "SYN/ACK" (SYNC/acknowledgement) message 214 back to the client 208 to let the client know that it can begin to communicate with the server 204 (this is part two of the three-way handshake). The client 208 then sends an ACK message back to the server 204 and begins communication with the server (this is part three of the three-way handshake).

Figure 3:
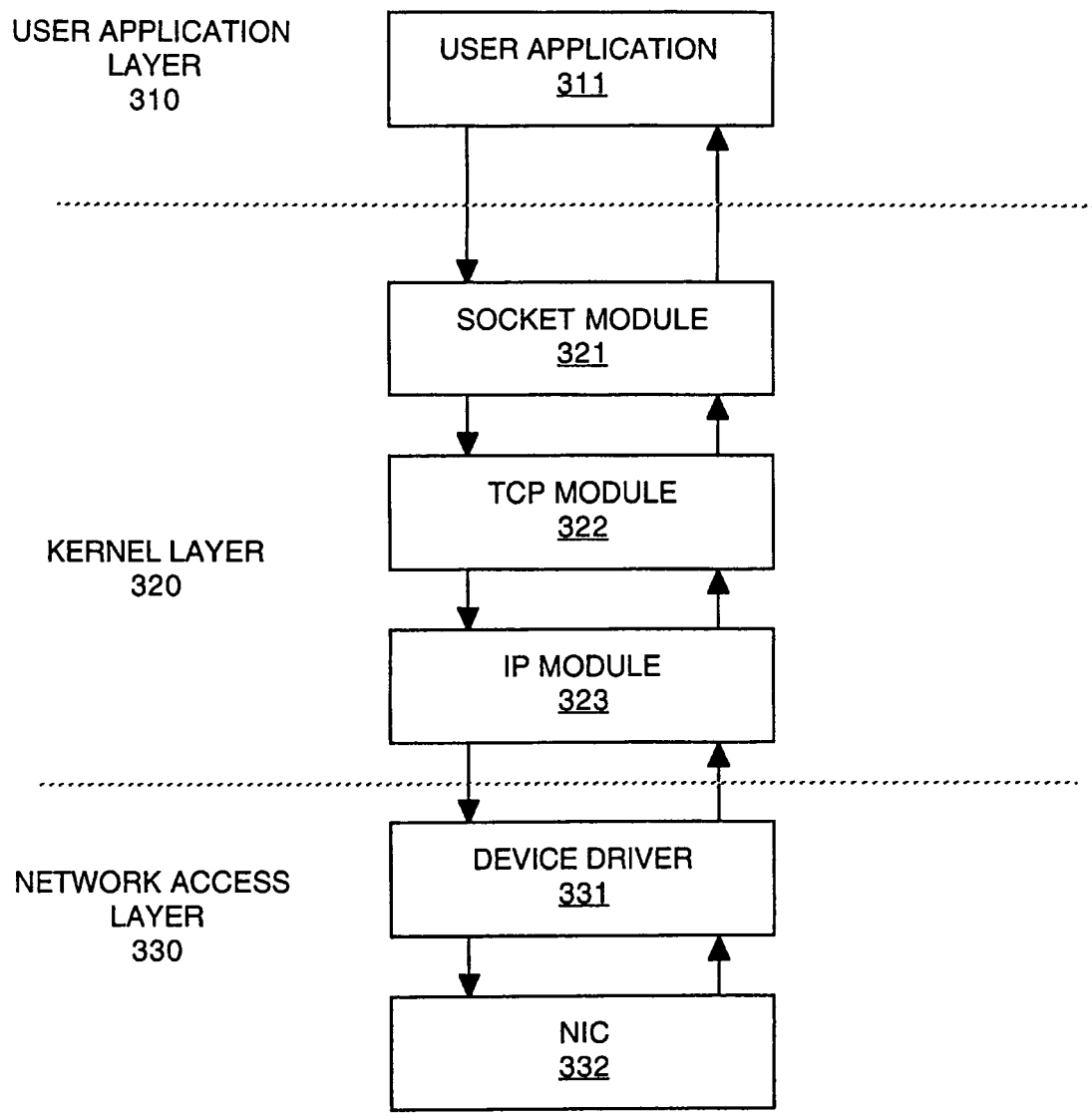
FIG. 3 is a block diagram of an exemplary communication connection comprising a user application layer, a kernel layer and a network access layer in accordance with an embodiment of the present invention.

FIG. 3 is a software layer illustration of a communication connection 300 comprising a user application layer 310, a kernel layer 320 and a network access layer 330. In accordance with the embodiment of FIG. 3, user application layer 310 comprises a user application 311 that provides a set of services for clients over the networks.

Kernel layer 320 comprises a variety of modules that perform specific functions when passing message packets upstream (e.g., from network access layer 330 to user application layer 310) and downstream (e.g., from user application layer 310 to network access layer 330). In accordance with an embodiment of the present invention, kernel layer 320 comprises protocol layers including socket module 321, transfer control protocol (TCP) module 322, and Internet protocol (IP) module 323. The modules comprising kernel layer 320 can be mapped to corresponding layers of the TCP/IP suite of protocols. That is, socket module 321 corresponds to the application layer of the TCP/IP protocol. Similarly, TCP module 322 and IP module 323 correspond to the transport and network layers, respectively of the TCP/IP suite of protocols. It is appreciated that in embodiments of the present invention, communication connection 300 may utilize other modules (e.g., a firewall module) in kernel layer 320. Furthermore, it is appreciated that the connection state for individual modules of connection 300 may be incorporated into a single connection structure called 'conn', wherein the modules are not distinct modules, but a culmination of modules merged together (e.g., a merged TCP/IP module).

Network access layer 330 provides physical access to communications network and corresponds to the network interface layer of the TCP/IP suite of protocols. Network access layer 330 comprises a device driver 331 and a NIC 332. It is appreciated that once a connection is established, it is generally maintained on the same NIC (e.g., once a connection is established on a particular NIC, all subsequent packets of that connection will be sent and received on the same NIC). The process and hardware required to maintain a connection on the same NIC are well known in the art. Any number of well-known protocol layers 321-323 can be used in accordance with the present embodiment.

Figure 4:
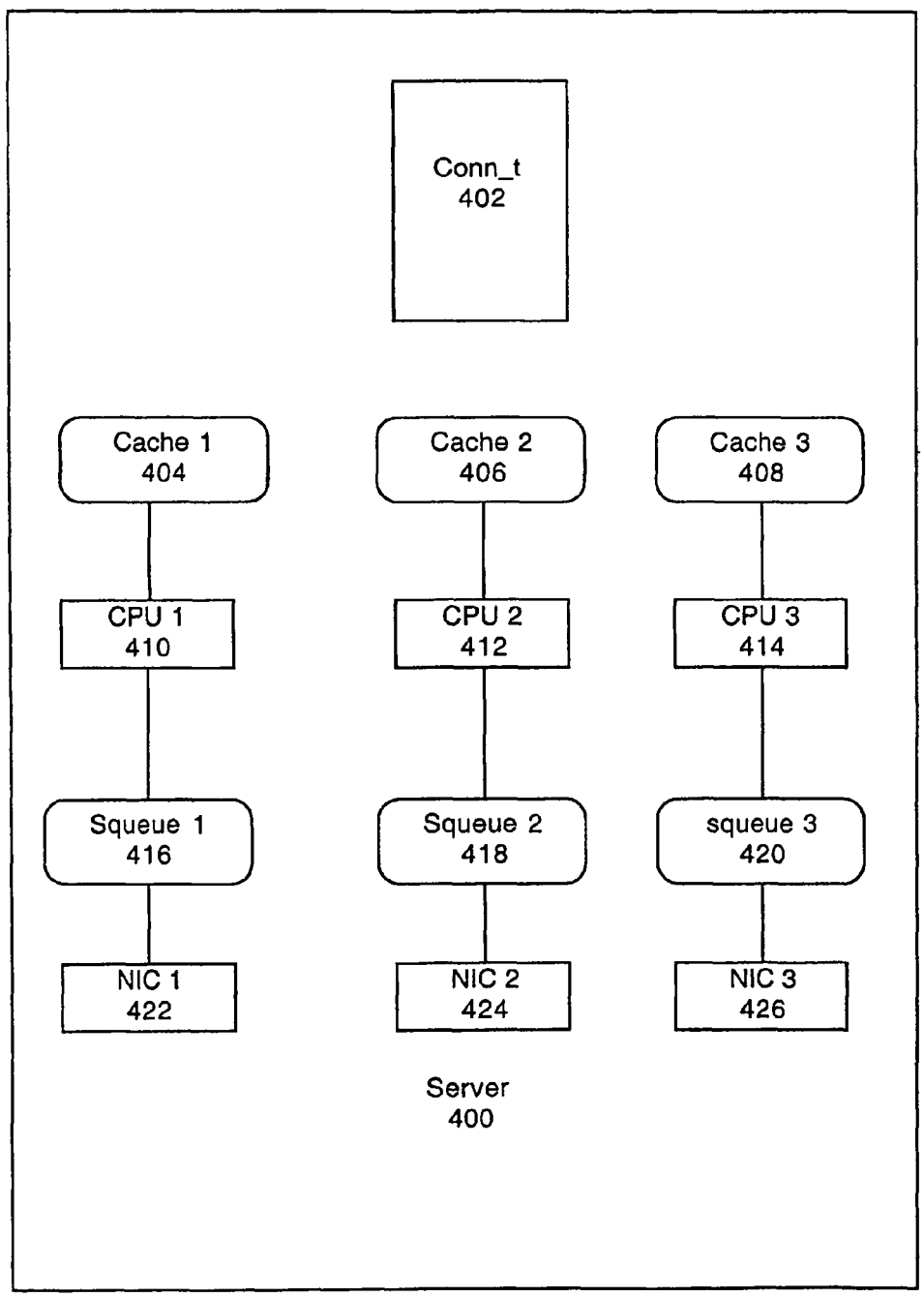
FIG. 4 is a block diagram of an exemplary server system wherein packets associated with a connection are assigned, routed and processed by the same processor in accordance with an embodiment of the present invention.

FIG. 4 is an illustration of an exemplary multiprocessor server 400 comprising a plurality of network interface cards (NICs), e.g., NICs 422, 424, and 426 that provide a connection interface to a client (e.g., a port) in accordance with an embodiment of present invention. Exemplary server 400 also comprises a plurality of central processing units (CPUs) or processors wherein each NIC is assigned to a specific CPU (e.g., NIC 422 is assigned to CPU 410). The present embodiment provides a system for per CPU synchronization called "vertical perimeters" inside a merged TCP/IP module. The vertical perimeter is implemented using a serialization queue, or data structure called 'squeue' in one embodiment. Table 1 comprises an exemplary data structure for 'squeue' in accordance with one embodiment of the present invention.

TABLE 1

```
#define           SQS_PROC 0x0001
typedef struct squeue {
   int_t          sq_flag;      /* Flags tells squeue status */
   kmutex_t       sq_lock;      /* Lock to protect the flag etc */
   mblk_t         *sq_first;    /* First Queued Packet */
   mblk_t         *sq_last;     /* Last Queued Packet */
   thread_t       sq_worker;    /* the worker thread for squeue */
} squeue_t;
```

The functionality of the queue is described as follows. Each CPU of the server system has an associated 'squeue' (serialization queue) for queuing packets destined for the associated CPU (e.g., 'squeue one' 416 queues packets destined for CPU one 410). In addition, each CPU has an optional limited amount of associated cache memory for storing connection information for current connections amongst other information CPU needs. For example, cache one 404 is associated with CPU one 410 and could store information about connections associated with CPU one 410. For example, embodiments of the present invention use a connection data structure called 'conn' that classifies each connection and provides routing information such that all packets associated with the connection are routed to a single assigned processor. The details of the 'conn' connection structure are discussed in greater detail below. Both 'conn' and 'squeue' data structures can reside in a computer readable memory.

As described further below, the 'squeue' data structure queues tasks to be performed by its associated processor. In one embodiment of the present invention this includes the processing of a communication packet that may be associated with a TCP connection. In accordance with embodiments of the present invention, once the processing starts for a data packet, the same processor will process the packet through the protocol layers 321-323 (FIG. 3) without requiring additional locks or queuing the packet between protocol layers. Furthermore, the same processor will similarly process all other packets of that TCP connection.

As described below, 'conn' data structure is used and associated with a TCP connection and stores a pointer to the 'squeue' its associated with and can be used to route packets to their respective processors. This is true for in-bound and out-bound packets.

The connection data structure ('conn') lookup for inbound packets is done outside the perimeter, using an IP connection classifier, as soon as a packet reaches the IP portion of the merged TCP/IP module. Based on the classification, the 'conn' (connection data structure) is retrieved from a memory resident connection classifier hash table (conn_t) table 402. For new connections, creation of 'conn', assigning it to a 'squeue' and inserting it in the connection classifier hash table (e.g., conn_t 402) happens outside the vertical perimeter. As a result, all packets for the same connection are processed on the 'squeue' to which it is bound. Advantageously, processing all packets associated with a connection on the same processor decreases processing time for the packet by reducing data state conflicts between protocol layers, for instance. Furthermore, a localized cache can be used in accordance with embodiments of the invention to further decrease processing time.

When a packet is received from a NIC (e.g., NIC 424), an interrupt thread classifies the packet and retrieves the connection data structure (e.g., 'conn') and the instance of the vertical perimeter or 'squeue', on which the packet needs to be processed. For a new incoming connection, the connection is assigned to the vertical perimeter instance attached to the interrupted CPU associated with the NIC, on which the connection was received. For outbound processing, the 'conn' can also stored in the file descriptor for the connection so that the 'squeue' can be retrieved from the 'conn'.

Vertical perimeters advantageously assure that only a single thread can process a given connection at any time thus serializing access to the TCP connection structure by multiple threads (from both read and write sides) in a merged TCP/IP module. Compared to a conventional perimeter, a vertical perimeter protects the whole connection state from IP to sockfs instead of merely protecting a module instance. As discussed further below, once a packet is being processed through the protocol layers by its processor, the thread is usually not interrupted unless to schedule a new task on its queue.

Figure 5:
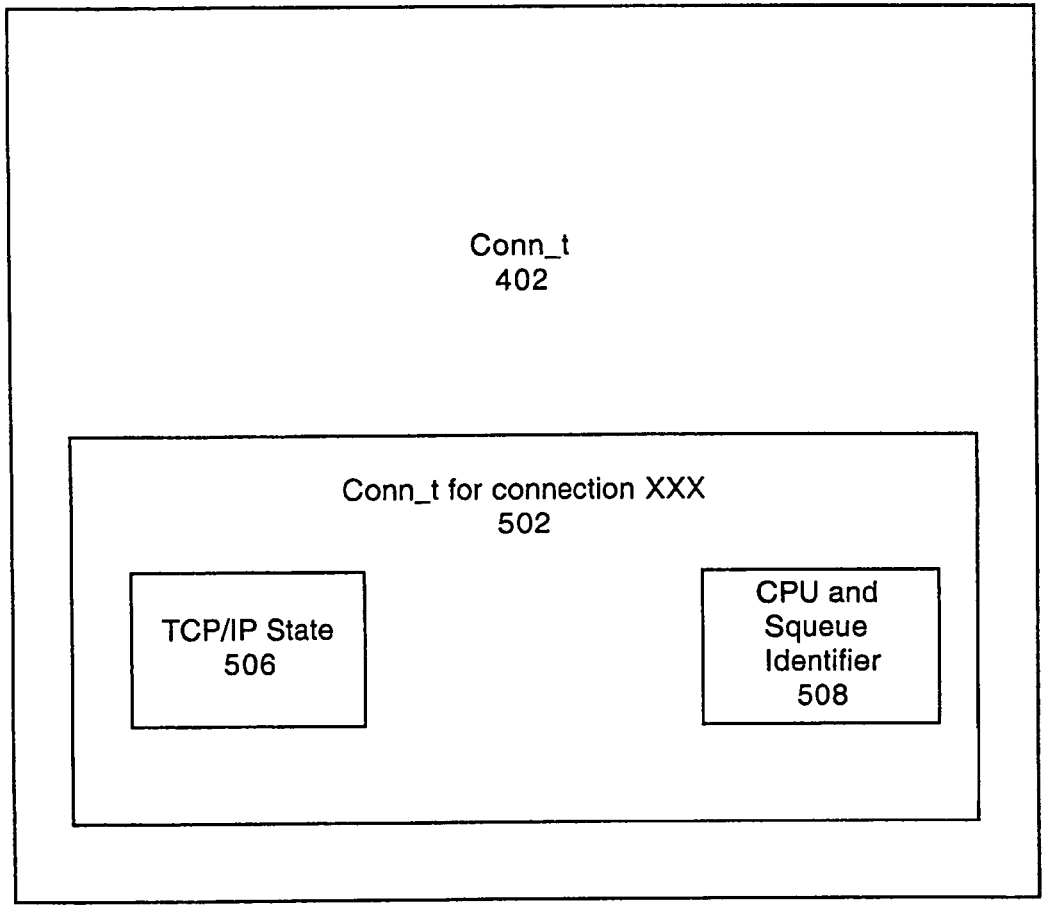
FIG. 5 is a block diagram of an exemplary connection structure used to classify a connection in accordance with an embodiment of the present invention.

FIG. 5 is a block diagram of an exemplary 'conn' (connection data structure) 402 in accordance with an embodiment of the present invention. The conn_t 402 stores information specific to a connection established on a server (e.g., server 400 from FIG. 4). When a new connection is established, a 'conn_t' is automatically created and stored in a memory resident database. The 'conn_t', in one embodiment of the present invention, comprises a connection state 506, and a 'squeue' 508 to which it is attached. It is appreciated that the 'conn' can also include various other entries to facilitate the processing of packets associated with the particular connection. In one embodiment of the invention, the squeue 508 also comprises a CPU identifier that defines a single processor for which the squeue is processed on.

Table 2 illustrates an exemplary connection data structure ('conn') used in one embodiment of the present invention.

TABLE 2

```
typedef struct conn {
    uint32_t     conn_ref;      /* Reference counter */
    uint32_t     conn_flags;    /* Flags */
    squeue_t     *conn_sqp;     /* squeue the conn will be processed on */
    /* Other connection state */
    } conn_t;
```

In one embodiment of the invention, when a packet is received, classification information (e.g., connection address information) is retrieved from the header portion of the packet and a hash index is computed based on which the associated 'conn' is retrieved from the CPU and squeue identifier 508. If an entry is not found, a 'conn' is created using the connection address information as the connection identifier. The 'squeue' identifier 508 defines the specific CPU that the connection is assigned to and is also stored in the 'conn'. This information routes packets for this connection to the proper processor.

Figure 6:
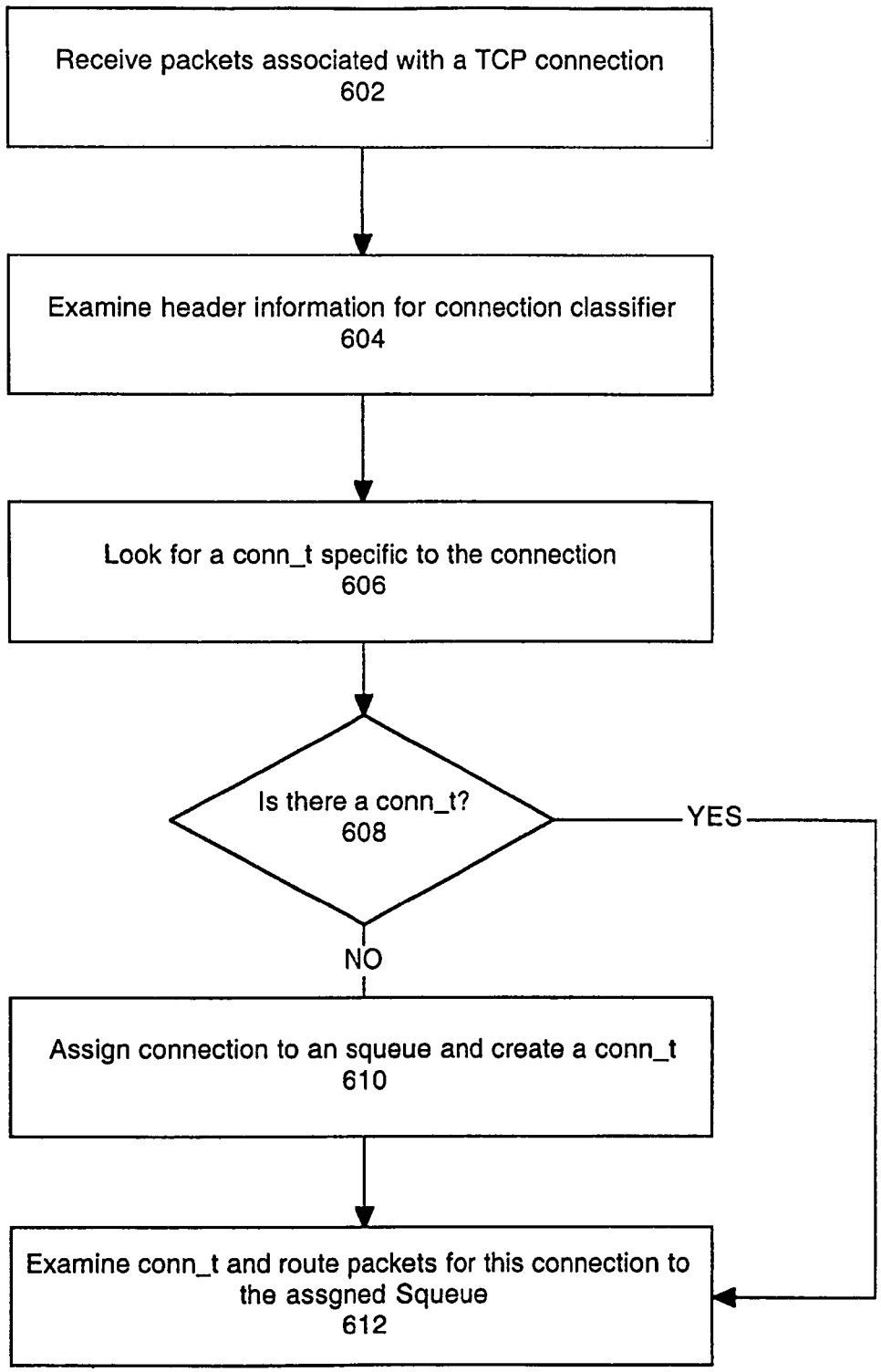
FIG. 6 is a flow diagram of an exemplary process for classifying a connection and assigning the connection to a single processor in accordance with embodiments of the present invention.

FIG. 6 is a flow diagram of an exemplary computer implemented process 600 for assigning a connection to a single processor on a multi-processor server system in accordance with embodiments of the present invention. Exemplary process 600 begins with step 602 wherein a TCP connection is received (e.g., packets associated with a TCP connection). The next step 604 is to examine the header portion of the packet to classify the packet and retrieve the connection structure 'conn' from the classifier step 606. As stated above, in one embodiment of the present invention, the connection is classified based on local IP address, a remote IP address, a local port address and a remote port address. The 'conn' database that corresponds to the connection classification retrieved from the header information of the packet.

In step 608, the presence of a 'conn' entry is determined. If the 'conn' is not found, in the next step 610, the connection is assigned to a specific 'squeue' that corresponds to a single processor and a 'conn' is created specifically for the new connection. However, if the 'conn' is found, in the next step 612, the 'conn' is examined and the attributes defined in the 'conn' are retrieved (e.g., assigned 'squeue', TCP sequence). The packet is then routed to the assigned 'squeue' associated with the assigned processor. The same method is used to create a 'conn' and assign it to an 'squeue' for a new outbound connection.

In one embodiment of the present invention, the 'conn' data is stored in a cache associated with the processor attached to assigned 'squeue'. By storing the connection information (e.g., 'conn') in a local cache, the time for retrieval is significantly reduced. Advantageously, since packets associated with a connection can be processed by the same processor, a localized cache can be used, thus eliminating the steps required to retrieve the data from a remote cache (e.g., a common cache).

Figure 7:
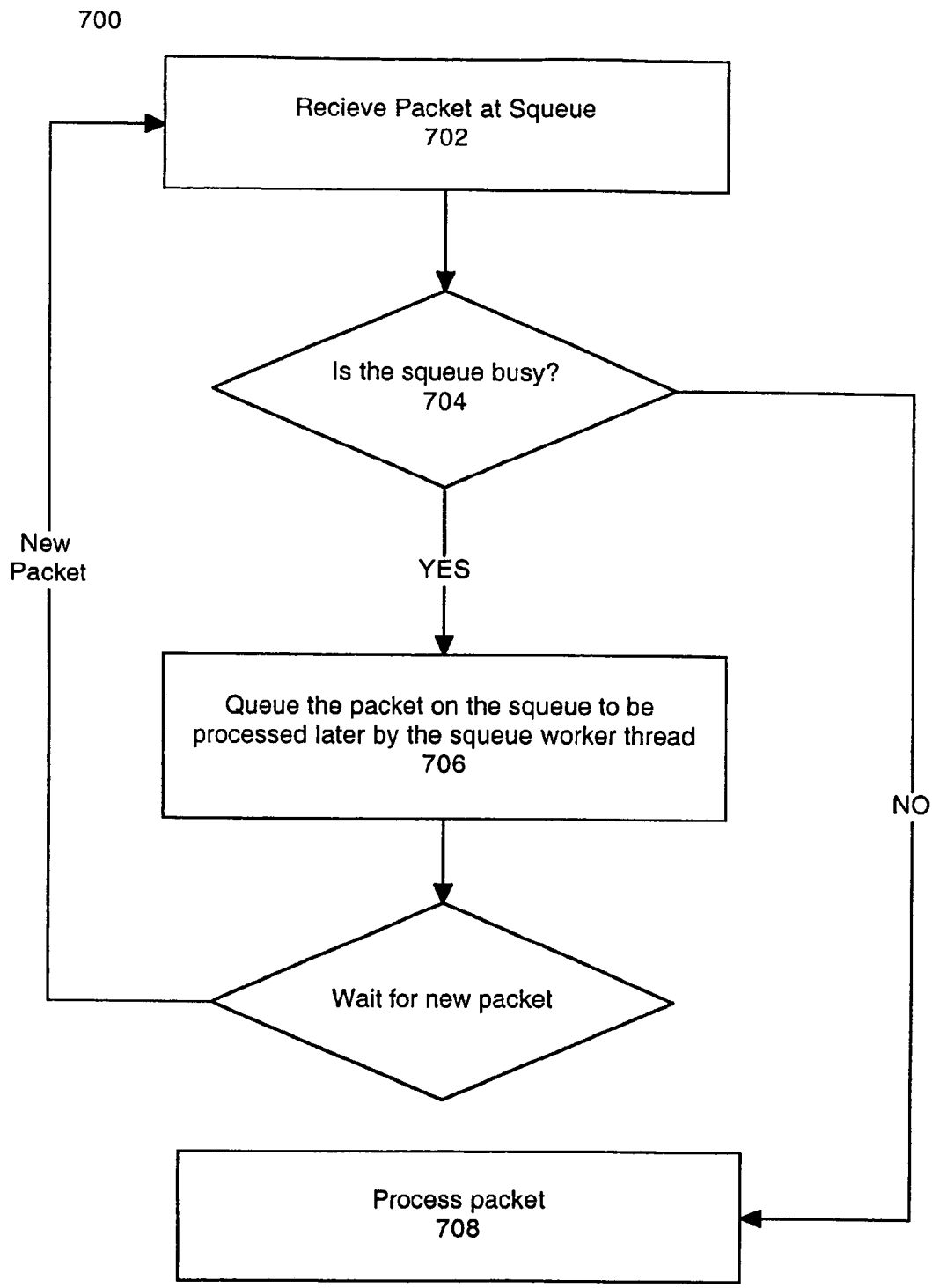
FIG. 7 is a flow diagram of an exemplary process for queuing packets in a queue specific to a processor in accordance with an embodiment of the present invention.

FIG. 7 is a flow diagram of an exemplary computer implemented process 700 wherein a packet destined for a particular processor is routed to a queue in accordance with an embodiment of the present invention. The first step 702 is to receive a packet at an 'squeue'. Then in step 704, the status of the 'squeue' is determined. If any thread is processing another packet through the protocol layers, in step 706, the packet is queued on the 'squeue' and will be processed when the thread inside the 'squeue' is done processing.

However, if the 'squeue' is not busy, in step 708, the designated thread (e.g., interrupt, worker or user thread) will mark the 'squeue' as busy or being processed and process the packet. In accordance with embodiments of the present invention, the thread will process a packet through the protocol layers without interruption, except by interrupt threads to queue any new packets received in between, e.g., step 706. For example, if the 'squeue' is busy, and is occupied by another thread processing an inbound or outbound packet, the processor is interrupted to queue the incoming (or outgoing) packet that is assigned to that processor step 706.

In accordance with embodiments of the invention, the time to process a packet is significantly reduced by processing all packets associated with a particular connection on the same processor and without interruption or queuing generally.

Embodiments of the present invention, a system and method for vertical perimeter protection have been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for processing packets through a plurality of protocol layers comprising:
accessing a packet associated with a connection;
processing said packet through said plurality of protocol layers using a single thread from a single processor by assigning said connection to a single processor of a multiprocessor server system for processing wherein packets associated with said connection are directed to said single thread in said single processor for processing and wherein connection state information used by said plurality of protocol layers is preserved by mutual exclusion of other threads from processing packets for said connection through said plurality of protocol layers; and
assigning said packet to a processing queue wherein said processing queue provides single threaded processing of said packet through said plurality of protocol layers,
wherein said processing queue provides single threaded processing of said packet through said plurality of protocol layers by assigning only one packet to be processed by said plurality of protocol layers at a time and
wherein said packet is assigned to said processing queue based on address information of said connection.

2. The method as described in claim 1 wherein said single thread is uninterrupted while processing said packet through said plurality of protocol layers.

3. A method for processing packets through a plurality of protocol layers comprising:
accessing a packet associated with a connection;
processing said packet through said plurality of protocol layers using a single thread from a single processor by assigning said connection to a single processor of a multiprocessor server system for processing wherein packets associated with said connection are directed to said single thread in said single processor for processing and wherein connection state information used by said plurality of protocol layers is preserved by mutual exclusion of other threads from processing packets for said connection through said plurality of protocol layers; and
generating a unique connection data structure specific to said connection based on address information of said connection stored in said packet associated with the connection.

4. The method as described in claim 3 wherein said address information comprises a local IP address and a remote IP address.

5. The method as described in claim 4 wherein said address information further comprises a remote port address and a local port address.

6. A method for processing packets through a plurality of protocol layers comprising:
accessing a packet associated with a connection;
processing said packet through said plurality of protocol layers using a single thread from a single processor by assigning said connection to a single processor of a multiprocessor server system for processing wherein packets associated with said connection are directed to said single thread in said single processor for processing and wherein connection state information used by said plurality of protocol layers is preserved by mutual exclusion of other threads from processing packets for said connection through said plurality of protocol layers; and
assigning said packet to a processing queue wherein said processing queue provides single threaded processing of said packet through said plurality of protocol layers,
wherein said processing queue is an squeue.

7. The method as described in claim 3 wherein subsequent data packets of said connection, are assigned to said single processor based on said connection data structure.

8. A method for processing packets comprising:
accessing a packet associated with a connection;
assigning said packet to a processing queue associated with a single processor of a multi processor server system, wherein said processing queue provides uninterrupted single threaded processing of said data packet associated with the connection through a plurality of protocol layers using a single thread of the single processor, wherein state information of the packet within the connection is preserved so as to mutually exclude other threads from processing packets of said connection through said plurality of protocol layers; and
generating a unique connection data structure associated with said connection based on address information of said connection stored in said packets associated with the connection.

9. The method as described in claim 8 wherein said address information comprises a local IP address and a remote IP address.

10. The method as described in claim 9 wherein said address information further comprises a remote port address and a local port address.

11. The method as described in claim 10 wherein said connection data structure is used to assign subsequent packets associated with said connection to said processing queue.

12. The method as described in claim 8 wherein said plurality of protocol layers includes a TCP protocol layer.

13. The method as described in claim 8 wherein said plurality of protocol layers includes an IP protocol layer.

14. A method as described in claim 8 wherein said queue is associated with said connection data structure.

15. A multiprocessor server system comprising:
- a plurality of processors for processing packets through a plurality of protocol layers;
- a plurality of threads running in the plurality of processors;
- a plurality of queues, each queue associated with a respective processor of said plurality of processors; and
- a memory resident connection data structure for assigning packets of a connection to a queue of said plurality of queues for processing said packets of said connection using a single thread associated with the single queue of a corresponding processor of said plurality of processors,
- wherein said connections are TCP connections and
- wherein said plurality of protocol layers comprise: IP; TCP; and socket layers.

16. A multiprocessor server system as described in claim 15 wherein a processor of said plurality of processors processes a packet of its queue without interruption through said plurality of protocol layers except for scheduling another packet on its queue.

17. A multiprocessor server system as described in claim 15 wherein said connection data structure is established for a new connection upon receiving a new connection request and wherein said connection data structure comprises an identifier of a queue associated with the single thread of the same corresponding processor to which all packets of said new connection are to be assigned.

18. A multiprocessor server system as described in claim 15 further comprising a plurality of cache memories, each cache associated with a respective processor of said plurality of processors.

19. A multiprocessor server system as described in claim 15 wherein state information of any given packet of a same connection is preserved because said packets of said same connection are individually mutually excluded form said protocol layers.

20. A computer system comprising a processor coupled to a bus and a memory coupled to said bus and comprising instructions that when executed implement a method for processing data packets comprising:
- accessing a packet associated with a connection; and
- processing said packet through said plurality of protocol layers using a single thread from a single processor by assigning said connection for processing to a single processor of a multiprocessor server system wherein packets associated with said connection are directed to said single thread associated with said single processor for processing, wherein connection state information used by said plurality of protocol layers is preserved by mutual exclusion of other threads processing packets for said connection through said plurality of protocol layers,
- wherein said packet are assigned to a processing queue,
- wherein said processing queue provides single threaded processing of said packet through said plurality of protocol layers,
- wherein said processing queue provides single threaded processing of said packet through said plurality of protocol layers by assigning only one packet to be processed by said plurality of protocol layers at a time, and
- wherein said packet is assigned to said processing queue based on address information of said connection.

21. The computer system as described in claim 20 wherein said single thread is uninterrupted while processing said packet through said plurality of protocol layers.

22. A computer system comprising a processor coupled to a bus and a memory coupled to said bus and comprising instructions that when executed implement a method for processing data packets comprising:
- accessing a packet associated with a connection; and
- processing said packet through said plurality of protocol layers using a single thread from a single processor by assigning said connection for processing to a single processor of a multiprocessor server system wherein packets associated with said connection are directed to said single thread associated with said single processor for processing, wherein connection state information used by said plurality of protocol layers is preserved by mutual exclusion of other threads processing packets for said connection through said plurality of protocol layers,
- wherein a unique connection data structure is generated specific to said connection based on address information of said connection stored in said packets associated with the connection.

23. The computer system as described in claim 22 wherein said address information comprises a local IP address and a remote IP address.

24. The computer system as described in claim 22 wherein said address information further comprises a remote port address and a local port address.

25. A computer system comprising a processor coupled to a bus and a memory coupled to said bus and comprising instructions that when executed implement a method for processing data packets comprising:
- accessing a packet associated with a connection; and
- assigning said packet to a processing queue associated with a single processor of a multi processor server system, wherein said processing queue provides uninterrupted single threaded processing of said data packet associated with the connection through a plurality of protocol layers using a single thread of the single processor, wherein state information of the packet within the connection is preserved so as to mutually exclude other threads from processing packets of said connection through said plurality of protocol layers,
- wherein a unique connection structure associated with said connection is generated based on address information of said connection stored in the packets associated with the connection.

26. The computer system as described in claim 25 wherein said processing queue provides mutual exclusion of same-connection packet processing through said plurality of protocol layers.

27. The computer system as described in claim 25 wherein said address information comprises a local IP address and a remote IP address.

28. The computer system as described in claim 27 wherein said address information further comprises a remote port address and a local port address.

29. The computer system as described in claim 28 wherein said connection structure is used to assign subsequent packets associated with said connection to said processing queue.

30. The computer system as described in claim 25 wherein said plurality of protocol layers includes a TCP protocol layer.

31. The computer system as described in claim 25 wherein said plurality of protocol layers includes an IP protocol layer.

32. The method as described in claim 3 wherein said single thread is uninterrupted while processing said packet through said plurality of protocol layers.

33. The method as described in claim 3 further comprising assigning said packet to a processing queue, wherein said processing queue provides a single threaded processing of said packet through said plurality of protocol layers.

34. The method as described in claim 33 wherein said processing queue provides a single threaded processing of said packet through said plurality of protocol layers by assigning only one packet to be processed by said plurality of protocol layers at a time.

35. The method as described in claim 34 wherein said packet is assigned to said processing queue based on address information of said connection.

* * * * *